(12) United States Patent
Morral Roca et al.

(10) Patent No.: US 11,975,882 B2
(45) Date of Patent: May 7, 2024

(54) METHOD AND SYSTEM FOR CALIBRATING AN AUTOMATIC POUCH FORMING MACHINE AND DEVICE FOR CHARACTERISING A POUCH PRECURSOR

(71) Applicant: MESPACK, SL, Santa Perpetua de Mogoda (ES)

(72) Inventors: Jose Morral Roca, Caldes de Montbui (ES); Guillem Lloret Maso, Sils (ES)

(*) Notice: Subject to any disclaimer, the term of this patent is extended or adjusted under 35 U.S.C. 154(b) by 0 days.

(21) Appl. No.: 17/989,820

(22) Filed: Nov. 18, 2022

(65) Prior Publication Data

US 2023/0159205 A1 May 25, 2023

(30) Foreign Application Priority Data

Nov. 24, 2021 (EP) ..................................... 21383059

(51) Int. Cl.
*B65B 51/14* (2006.01)
*B65B 57/04* (2006.01)
*B65B 51/10* (2006.01)

(52) U.S. Cl.
CPC ............ *B65B 57/04* (2013.01); *B65B 51/146* (2013.01); *B65B 2051/105* (2013.01)

(58) Field of Classification Search
USPC ............................................................ 53/64
See application file for complete search history.

(56) References Cited

U.S. PATENT DOCUMENTS

| | | | | |
|---|---|---|---|---|
| 6,129,809 A | * | 10/2000 | Ellenberger | ........ B29C 66/9231 |
| | | | | 156/352 |
| 2016/0096645 A1 | * | 4/2016 | Lancaster, III | ......... B65B 57/12 |
| | | | | 53/64 |

* cited by examiner

*Primary Examiner* — Chinyere J Rushing-Tucker
(74) *Attorney, Agent, or Firm* — Eugenio J. Torres-Oyola; Victor M. Rodriguez-Reyes; Rafael Rodriguez-Muriel

(57) ABSTRACT

The present invention relates to a method and to a system for calibrating an automatic pouch forming machine. The present invention also relates to a device for characterizing a pouch precursor made of flexible heat-sealable film, said device comprising: a punch; a heat source for heating at least a tip of the punch to a given temperature; an actuator for pressing the punch against the pouch precursor made of heat-sealable film, with a given pressure; a measurement device for measuring the penetration of the punch in the pouch precursor, under the given conditions of temperature and pressure.

13 Claims, 8 Drawing Sheets

METHOD AND SYSTEM FOR CALIBRATING AN AUTOMATIC POUCH FORMING MACHINE AND DEVICE FOR CHARACTERISING A POUCH PRECURSOR

TECHNICAL FIELD

The present invention generally relates to the field of automatic pouch forming machines, and, in particular, to the field of calibration of automatic pouch forming machines.

The present invention also relates to the field of devices for characterising a pouch precursor made of flexible heat-sealable film.

STATE OF THE ART

Automatic pouch forming machines are known in the prior art which are capable of forming containers in the form of a pouch or bag from a band of flexible heat-sealable film supplied from a reel. Some automatic pouch forming machines, or packaging forming machines, are also capable of filling said containers with one or more products, and hermetically sealing the filled containers.

A welding unit is used in automatic pouch forming machines to form welds at the edges of the pouch, package or container by heat sealing.

It is important that pouches or packages are correctly sealed and cut, so that the product contained therein does not come into contact with the outside environment, thus avoiding possible contamination and/or deterioration.

Adjusting the operating parameters of known automatic pouch forming machines usually requires a lot of expertise and a significant amount of 'trial and error', which typically also takes a significant amount of time. Ideally, the operating parameters of an automatic pouch forming machine should be adjusted every time the material of the container precursor, the product to be packaged, the dimensions of the package, etc. changes. Therefore, it might be necessary, or at least recommended, to calibrate relatively often an automatic pouch forming machine.

Moreover, the mechanical properties of different batches or reels of pouch precursors of the same type may vary, thereby requiring a further adjustment of the operating parameters if little defects on the pouches or packages are to be avoided.

BRIEF DESCRIPTION OF THE INVENTION

The present invention is directed towards a method for calibrating an automatic pouch forming machine that, in an easy and fast manner, adjusts the operating parameters of an automatic pouch forming machine, without requiring the expertise and know-how of a qualified technician and avoiding a 'trial and error' approach. In order to do so, according to a first aspect of the present invention, it is disclosed a method for calibrating an automatic pouch forming machine comprising an unwinding unit for unwinding a pouch precursor made of a band of a flexible heat-sealable film in a forward movement direction; a folding unit of the band configured for folding said band in half on itself along at least one folding line parallel to the forward movement direction, a welding unit of the folded band configured for making welding lines at least in a direction transverse to the forward movement direction of the folded band; and a drive unit for moving the band in the forward movement direction; the method comprising the steps of: performing a test operation on the material of the pouch precursor; performing a characterisation of the material of the pouch precursor based on the results of the testing of the material performed; conducting a comparison of the characterised material of the pouch precursor with other known materials on which the steps of the test operation and the characterisation have already been performed, said known materials being further related to known operation parameters of a pouch forming machine including welding pressure, welding temperature and welding time; and automatically adjusting the automatic pouch forming machine with operating parameters including welding pressure, welding temperature and welding time for the tested material of the pouch precursor obtained from the result of conducting the comparison and an algorithm treating said results; wherein the step of performing a test operation is performed by the following steps: pressing the band folded on itself of the pouch precursor with a punch, said punch being heatable at least at one tip by a heat source at a given temperature; and measuring the penetration of the punch in the band folded on itself with a measurement device; and wherein the steps of conducting a comparison and automatically adjusting the automatic pouch forming machine, are implemented by a processing unit.

Said processing unit may be a local computer, a server, a network-based processing unit, a cloud-based processing unit, etc Thanks to the first aspect of the present invention, the operation parameters of an automatic pouch forming machine for a certain pouch precursor can be easily and precisely determined, without requiring a 'trial and error' approach, neither the experience of a trained user or technician that may infer the parameters based on his experience, training, etc. The method according to the first aspect of the present invention also has the advantage of being more consistent than the traditional 'trial and error' approach.

Additionally, the present invention also reduces the leftover or waste material produced during the calibration of the automatic pouch forming machine, as the traditional method of 'trial and error' requires multiple runs of the machine, while trying to optimise the operating parameters, thereby producing multiple packages that do not meet the minimum requirements to be used and, consequently, have to be recycled or disposed, whereas in the present invention no test runs are required as the operating parameters are precisely defined at the first try. Consequently, the method of the present invention is also more environmentally friendly than the traditional methods of calibrating an automatic pouch forming machine.

According to the first aspect of the present invention, the step of performing a test operation may be performed on the automatic pouch forming machine, that is to say, the material of the pouch precursor may be tested on the automatic forming machine that is going to use said precursor to create pouches.

According to the first aspect of the present invention, the step of performing a test operation may be performed while the pouch precursor moves in the forward movement direction, that is to say, the material of the pouch precursor may be tested while the automatic pouch forming machine is in operation.

According to the first aspect of the present invention, the step of performing a test operation may be performed with the pouch precursor stopped with respect to its forward movement direction.

According to the first aspect of the present invention, the step of performing a test operation on the material of the pouch precursor, may be performed outside the automatic pouch forming machine, that is to say, the material of the pouch precursor can be tested in a device not forming part of the automatic pouch forming machine, for example, in a lab. In such case, the pouch precursor tested is from the same reel as the pouch precursor that is intended to be used to create the pouches. Said testing device is preferably a device according to a second aspect of the present invention, which is described hereinafter.

According to the first aspect of the present invention, the penetration of the punch in the pouch precursor may be measured with respect to one or more values of at least two of the following variables: pressure applied by the punch to the pouch precursor; temperature of the tip of the punch; duration of the pressure applied to the pouch precursor by the punch.

According to the first aspect of the present invention, the step of performing a characterization of the material of the pouch precursor, may comprise the step of obtaining a characteristic curve of the tested material based on the measurements of the penetration of the punch under given conditions of pressure, temperature and duration. Said pressure should be understood as the pressure applied by the punch to the pouch precursor, said temperature should be understood as the temperature of the punch when pressing the pouch precursor and the duration should be understood as the time that a certain pressure is applied to the pouch precursor by the punch. However, other parameters can also be used to characterise the material of the pouch precursor.

According to the first aspect of the present invention, the method may further comprise the step of generating a database with the operating parameters of an automatic pouch forming machine for a plurality of known materials. By doing so, an algorithm can subsequently use the known operating parameters corresponding to known materials to determine the operating parameters corresponding to the tested material.

According to the first aspect of the present invention, the operating parameters corresponding to the characterised material obtained in the step of automatically adjusting the automatic pouch forming machine may be entered in said database. In this way, the database with the operating parameters of an automatic pouch forming machine for a plurality of known materials increases, which may aid the subsequent determination of the operating parameters in a subsequent test.

According to a second aspect of the present invention it is disclosed a device for characterising a pouch precursor made of flexible heat-sealable film, said device comprising: a punch; a heat source for heating at least a tip of the punch to a given temperature; an actuator for pressing the punch against the pouch precursor made of heat-sealable film, with a given pressure; a measurement device for measuring the penetration of the punch in the pouch precursor, under the given conditions of temperature and pressure.

The device according to the second aspect of the present invention characterises the material of a certain pouch precursor so that an automatic pouch forming machine can be calibrated so that it can precisely operate using said pouch precursor, without needing a 'trial and error' approach to determine the optimum operating parameters of said automatic pouch forming machine using said pouch precursor.

The device according to the second aspect of the present invention can be used as a standalone device, for example, in a testing material lab, or as a device installed on, or close to, the automatic pouch forming machine to be calibrated.

According to the second aspect of the present invention, the punch may comprise a ceramic resistor, acting as a heat source, arranged at a tip of the punch. However, in other embodiment the device may comprise a different heat source for heating the tip of the punch, for example, the device may comprise a magnetic induction unit for heating the tip of the punch, a fan heater that blows hot air to the tip of the punch, a coiled or tubular heating element arranged close to, or in contact with, the tip of the punch, etc.

According to the second aspect of the present invention, the measurement device for measuring the penetration of the punch in the pouch precursor may comprise a micrometre.

According to the second aspect of the present invention, the device for characterising a pouch precursor made of flexible heat-sealable film may further comprise a processing unit configured to execute the steps of conducting a comparison and automatically adjusting an automatic pouch forming machine of a method according to the first aspect of the present invention.

According to a third aspect of the present invention, it is disclosed a system for calibrating an automatic pouch forming machine, the system comprising: an automatic pouch forming machine; a processing unit configured to execute the steps of conducting a comparison and automatically adjusting an automatic pouch forming machine of a method according to the first aspect of the present invention; and a device for characterising a pouch precursor made of flexible heat-sealable film according to the second aspect of the present invention; wherein the automatic pouch forming machine comprises an unwinding unit for unwinding a pouch precursor made of a band of a flexible heat-sealable film in a forward movement direction; a folding unit of the band configured for folding said band in half on itself along at least one folding line parallel to the forward movement direction, a welding unit of the folded band configured for making welding lines at least in a direction transverse to the forward movement direction of the folded band; and a drive unit for moving the band in the forward movement direction.

The third aspect of the present invention provides an automatic pouch forming machine and a device for characterising a pouch precursor according to the second aspect of the present invention and a processing unit configured to automatically adjust the operating parameters of the automatic pouch forming machine provided in said third aspect, thereby providing the elements to calibrate the operating parameters of an automatic pouch forming machine based on the pouch precursor to be used in said machine.

According to the third aspect of the present invention, the measurement device may be configured to measure the penetration of the punch in the band folded on itself of the pouch precursor by measuring the travel of the punch.

According to the third aspect of the present invention, said processing unit may be a local computer, a server, a network-based processing unit, a cloud-based processing unit, etc.

It will be understood that references to geometric position, such as parallel, perpendicular, tangent, etc. allow deviations up to ±5° from the theoretical position defined by this nomenclature.

It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which.

DETAILED DESCRIPTION OF AN EMBODIMENT

The foregoing and other advantages and features will be more fully understood from the following detailed description of an embodiment with reference to the accompanying drawings, to be taken in an illustrative and not limitative way.

Figure 1:
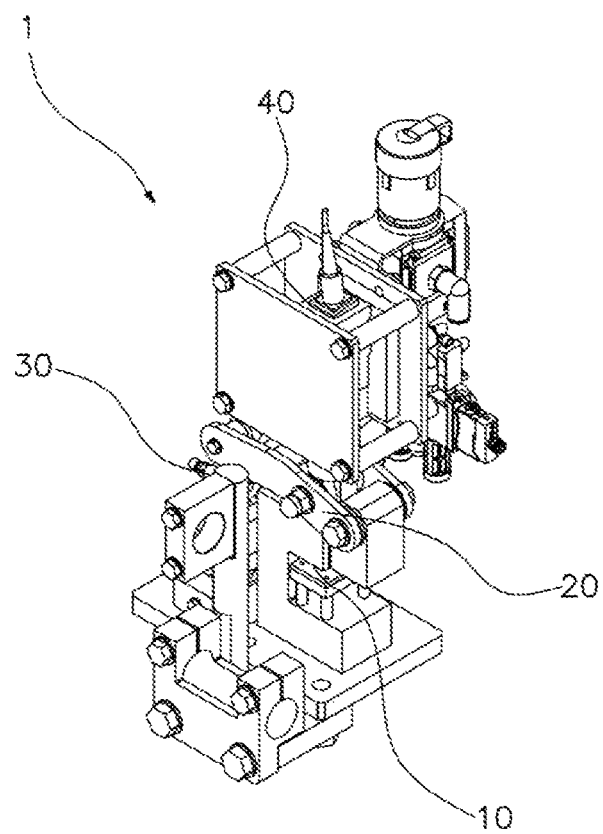
FIG. 1 shows a perspective view of a first exemplary embodiment of a device for characterising a pouch precursor made of flexible heat-sealable film according to the present invention.
Figure 2:
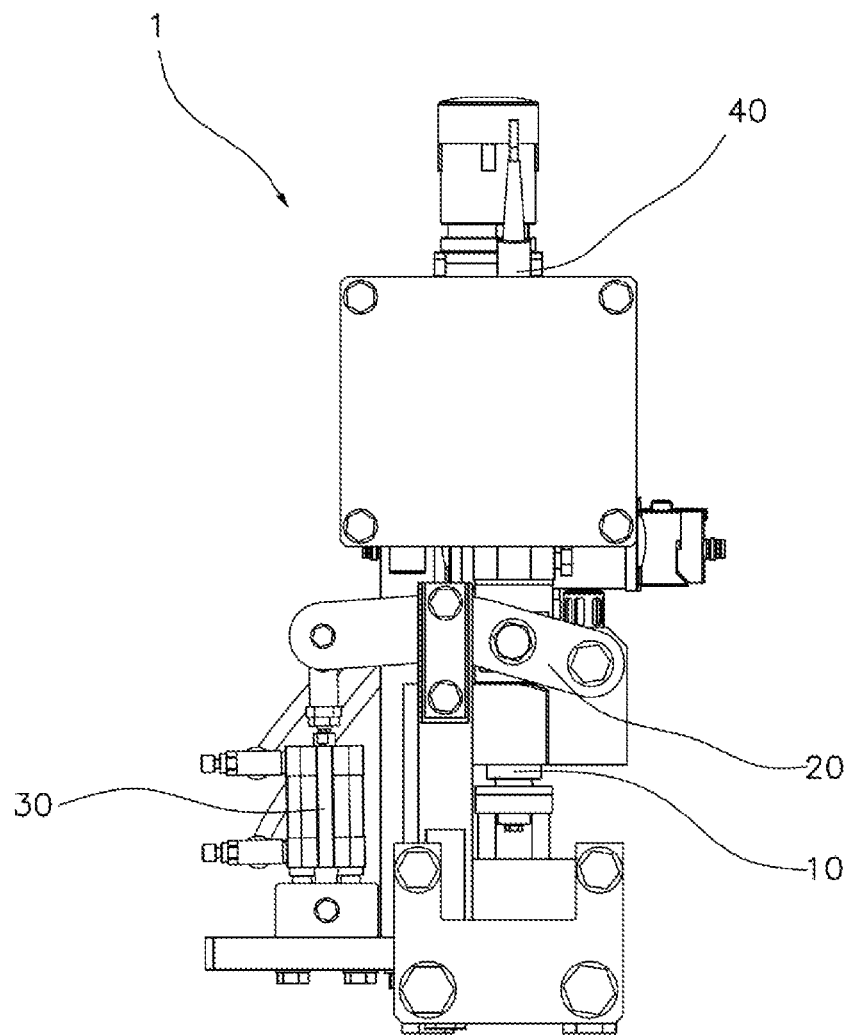
FIG. 2 shows a front view of the first exemplary embodiment of a device for characterising a pouch precursor shown in FIG. 1.
Figure 3:
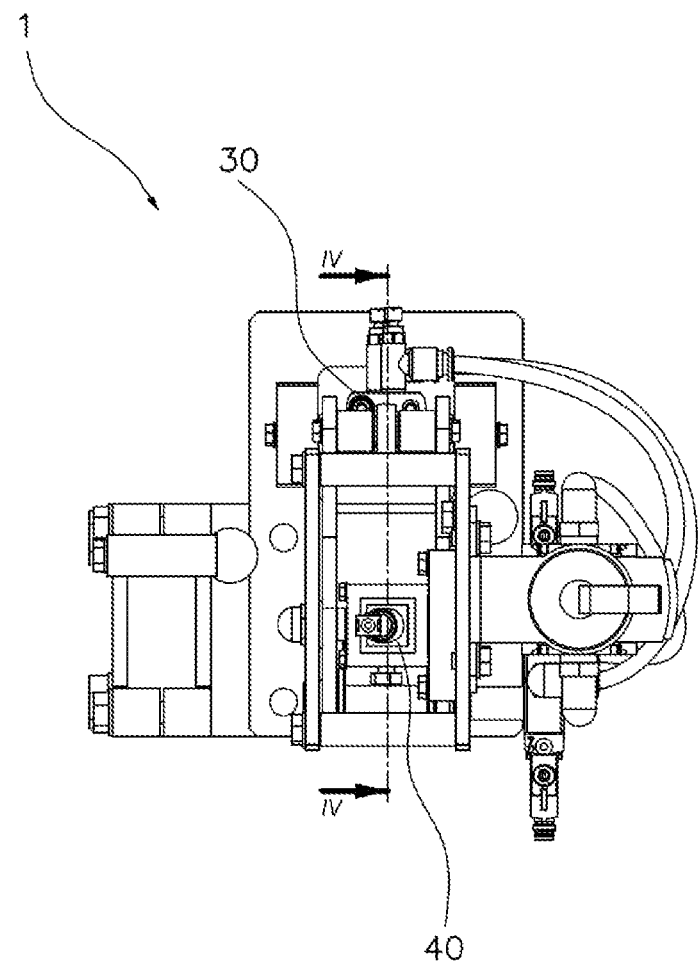
FIG. 3 shows a top view of the first exemplary embodiment of a device for characterising a pouch precursor shown in FIGS. 1 and 2.

FIGS. 1 to 3 show a perspective, front and top view, respectively, of a first exemplary embodiment of a device 1 for characterising a pouch precursor made of flexible heat-sealable film according to the present invention, said device 1 comprising a punch 10, a heat source for heating at least a tip of the punch 10 to a given temperature, an actuator for pressing the punch 10 against the pouch precursor made of heat-sealable film, with a given pressure, and a measurement device 40 for measuring the penetration of the punch 10 in the pouch precursor, under the given conditions of temperature and pressure.

The device 1 for characterising a pouch precursor made of flexible heat-sealable film according to the present invention may be configured to perform one or more tests to determine the physical properties of a pouch precursor, i.e., to characterise a pouch precursor. Once a pouch precursor is characterised, the operating parameters of an automatic pouch forming machine can be determined with a method and/or a system according to the present invention, as will be explained hereinafter.

In the first exemplary embodiment shown, the actuator comprises a pneumatic cylinder 30 operatively connected to the punch 10 via at least a connecting rod 20. In other embodiments, the cylinder 30 can be operatively connected to the punch 10 using any other suitable mechanism. It is also possible that, in other embodiments, the punch 10 is fixed or attached to the piston rod of the cylinder 30. In other embodiments, said cylinder 30 can be hydraulic instead of pneumatic.

The first exemplary embodiment of a device 1 according to the present invention can be installed on, or be related to, an automatic pouch forming machine or be installed in a standalone manner, for example, in a testing material lab or any other suitable room without an automatic pouch forming machine therein. If the device 1 is installed in a standalone configuration, independent from any automatic pouch forming machine, the results obtained by said device 1, can be used to calibrate the operating parameters of any suitable automatic pouch forming machine that uses the same pouch precursor tested or characterised by said device 1.

Figure 4:
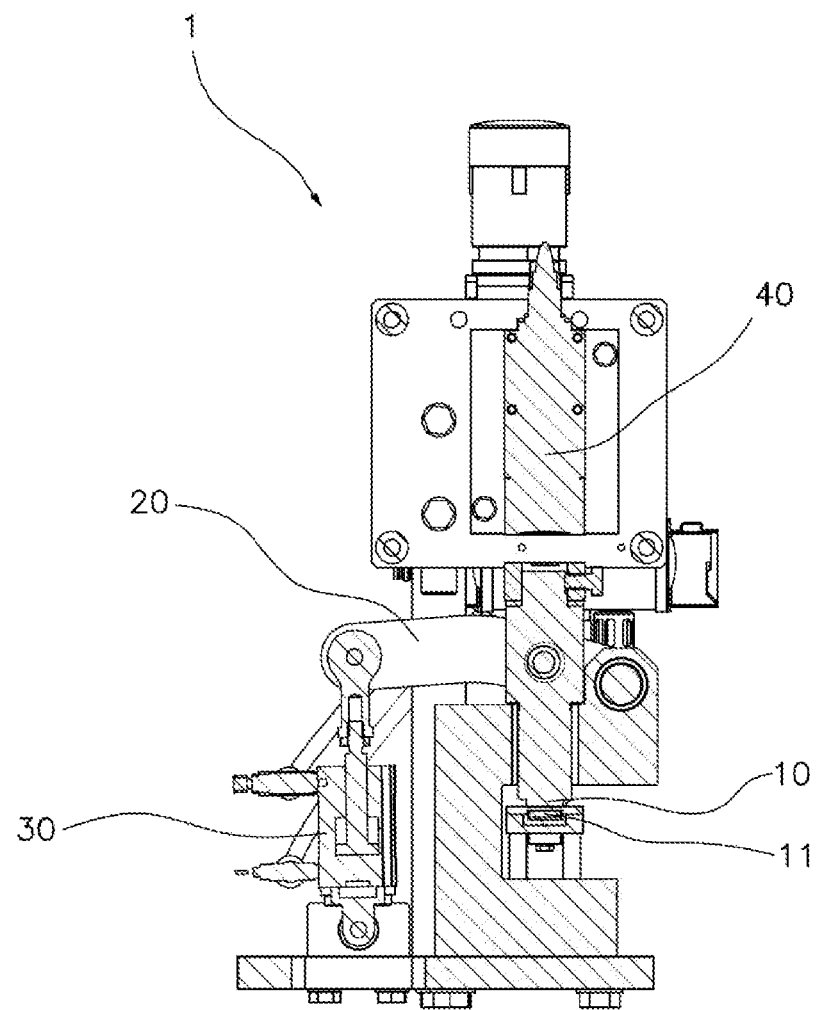
FIG. 4 shows a cut view of the first exemplary embodiment of a device for characterising a pouch precursor along the cut line IV-IV shown in FIG. 3

FIG. 4 shows a cut view along the cut line IV-IV depicted in FIG. 3 of the first exemplary embodiment of a device 1 according to the present invention. In this first exemplary embodiment, the punch 10 comprises a ceramic resistor 11 acting as a heat source arranged at a tip of the punch 10. However, in other embodiments, the heat source can heat the punch 10, or at least its tip, by other means, for example, magnetic induction.

Arranged over the punch 10, and aligned with it, the first exemplary embodiment comprises the measurement device 40 for measuring the penetration of the punch 10 in the pouch precursor. In the exemplary embodiment shown, the measurement device 40 comprises a micrometre which measures the travel of said punch 10.

As can be seen in greater detail in the cut view of FIG. 4, in the first exemplary embodiment, a first end of the connecting rod 20 is connected in an articulated manner to the piston rod of the cylinder 30 and a second end of the connecting rod 20, opposite to the first one, is connected in an articulated manner to the body of the device 1. The punch 10 is connected in an articulated manner to the connecting rod 20 at a point located between said first and second ends.

Figure 5:
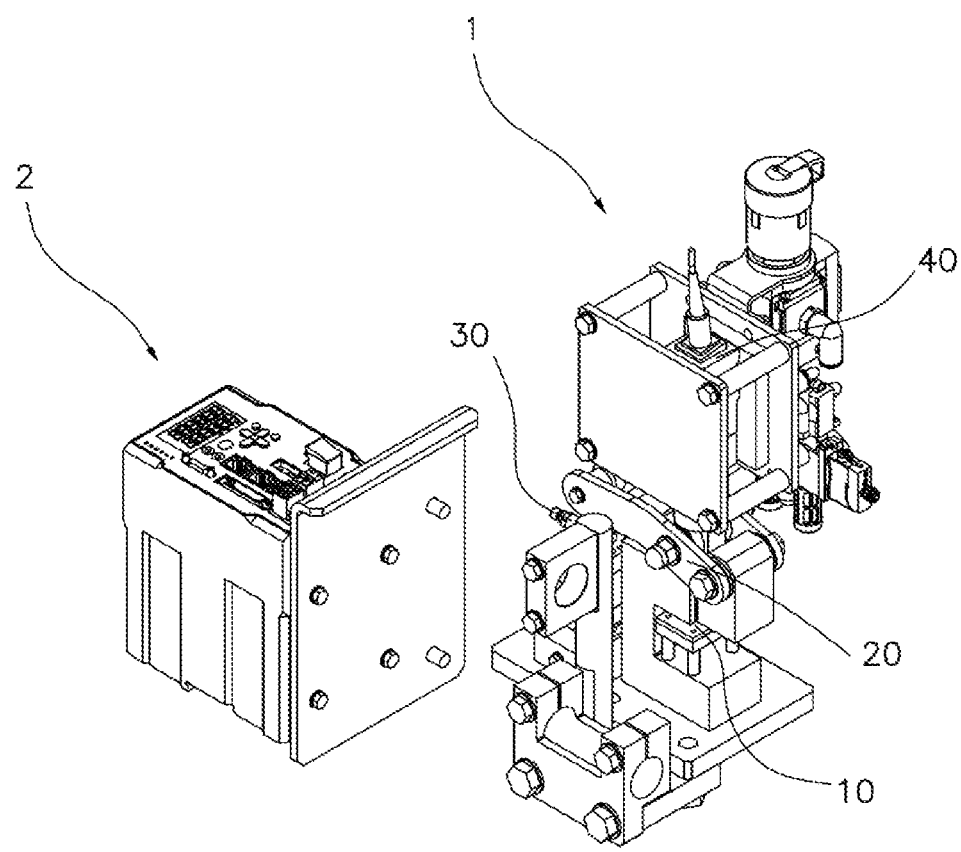
FIG. 5 shows a perspective view of a second exemplary embodiment of a device for characterising a pouch precursor made of flexible heat-sealable film according to the present invention.

FIG. 5 shows a perspective view of a second exemplary embodiment of a device 1 for characterising a pouch precursor made of flexible heat-sealable film according to the present invention.

Similarly to the first exemplary embodiment of a device 1 for characterising a pouch precursor made of flexible heat-sealable film according to the present invention, this second exemplary embodiment can also be installed on, or closely related to, an automatic pouch forming machine or in a standalone configuration.

Figure 8:
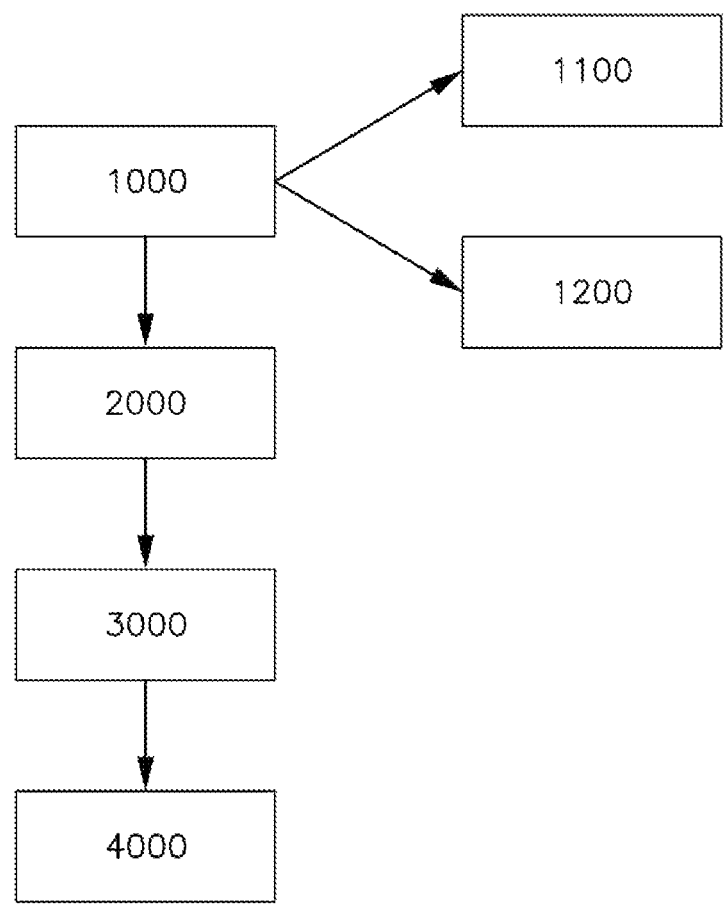
FIG. 8 shows a flow diagram of a first exemplary embodiment of a method for calibrating an automatic pouch forming machine according to the present invention.

Compared to the first exemplary embodiment shown in FIGS. 1 to 4, the second exemplary embodiment shown in FIG. 5 further comprises a processing unit 2 configured to execute the steps of conducting a comparison 3000 and automatically adjusting the automatic pouch forming machine 4000 of a method for calibrating an automatic pouch forming machine according to the present invention, said method being described in great detail in the context of FIG. 8.

In this second exemplary embodiment the processing unit 2 is not integral with the body of the device 1, that is to say, it is a separate element. However, in other embodiments the processing unit 2 can be integral with the body of the device 1.

Both the first and second exemplary embodiments of a device 1 for characterising a pouch precursor can perform the penetration tests with its punch 10 on a pouch precursor made of an unfolded band of flexible heat-sealable film or on a pouch precursor made of a band of flexible heat-sealable film folded at least in half along a folding line following a longitudinal direction of said band.

Figure 6:
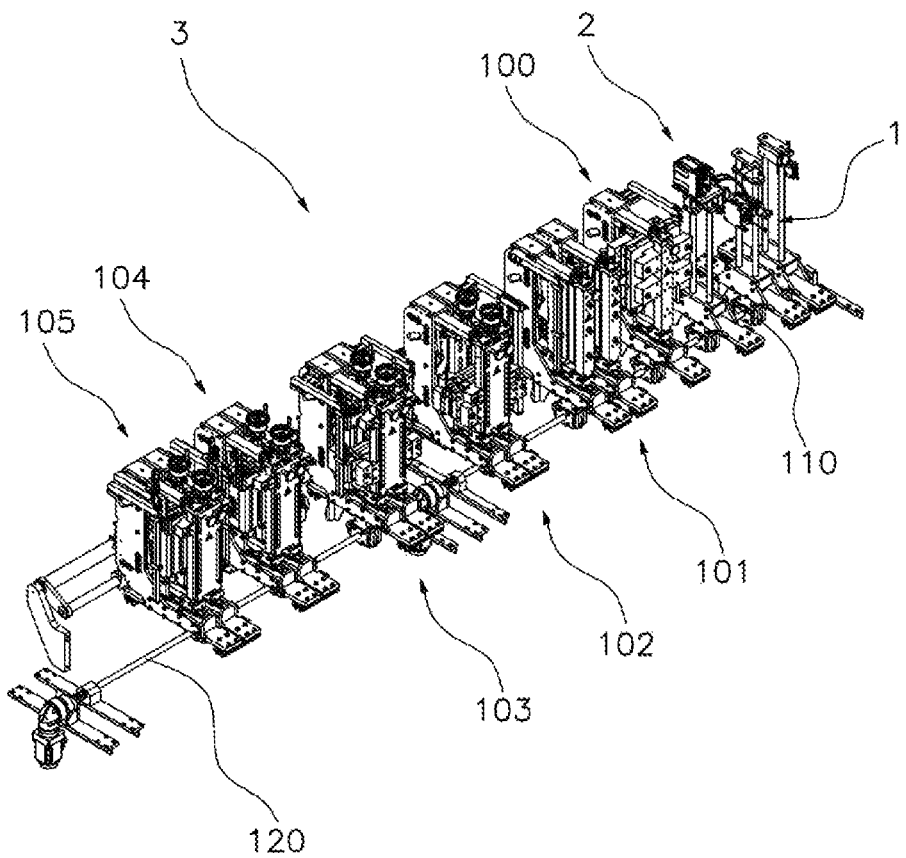
FIG. 6 shows a perspective view of the welding unit of an automatic pouch forming machine of a first exemplary embodiment of a system for calibrating an automatic pouch forming machine according to the present invention.

FIG. 6 shows a perspective view of a first exemplary embodiment of part of a system for calibrating an automatic pouch forming machine according to the present invention. In particular, FIG. 6 shows a perspective view of the welding unit 3 of an automatic pouch forming machine comprised in the first exemplary embodiment of a system according to the present invention. The welding unit 3 of the first exemplary embodiment shown comprises a plurality of pressure applicators 100, 101, 102, 103, 104, 105 fixed in a slidable manner to a guide 120, so that their longitudinal position along a longitudinal axis of the welding unit 3 can be adjusted. However, in other embodiments, the welding unit 3 can have a different configuration than the one shown in FIG. 6, for example, can lack the guide 120 or have less pressure applicators 100, 101, 102, 103, 104, 105.

In the exemplary embodiment shown, at an end thereof, the welding unit 3 comprises a device 1 for characterising a pouch precursor made of flexible heat-sealable film according to the present invention. The welding unit 3 of this third exemplary embodiment of a system according to the present invention further comprises a processing unit 2 configured to execute the steps of conducting a comparison 3000 and automatically adjusting the automatic pouch forming machine 4000 of a method according to the present invention. Said steps 3000, 4000 are described in great detail hereinafter in the context of FIG. 8.

Although it is not shown, the automatic pouch forming machine of the first exemplary embodiment of a system according to the present invention comprises: an unwinding unit for unwinding a pouch precursor made of a band of a flexible heat-sealable film in a forward movement direction; a folding unit of the band configured for folding said band in half on itself along at least one folding line parallel to the forward movement direction, a welding unit of the folded band configured for making welding lines at least in a direction transverse to the forward movement direction of the folded band; and a drive unit for moving the band in the forward movement direction.

Figure 7:
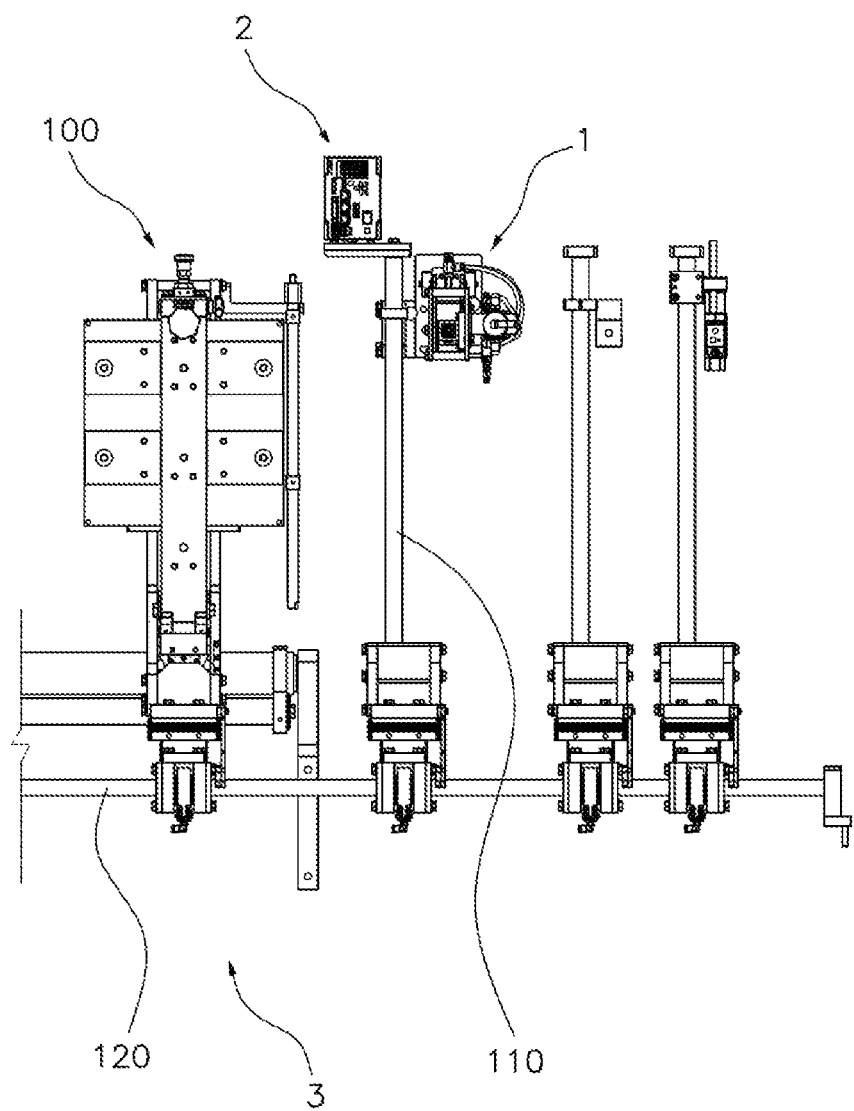
FIG. 7 show a front view of part of the welding unit of the automatic pouch forming machine of the first exemplary embodiment of a system for calibrating an automatic pouch forming machine shown in FIG. 6.

FIG. 7 shows a front view of part of the first exemplary embodiment of a system for calibrating an automatic pouch forming machine shown in FIG. 6 and, in particular, FIG. 7 shows a front view of part of the welding unit 3 shown in FIG. 6.

In the first exemplary embodiment shown, the device 1 for characterising a pouch precursor is supported in a slidable manner by a support 110, which is also slidable along the guide 120. In particular, the device 1 can slide along a bar of the support defining an axis perpendicular to the longitudinal direction of the welding unit and perpendicular to the forward movement direction of the pouch precursor made of a band of a flexible heat-sealable film. In the exemplary embodiment shown, the processing unit 2 is fixed on top of the support 110, but in other embodiments such processing unit 2 could be installed in any other suitable location of the automatic pouch forming machine or outside said automatic pouch forming machine. As long as the processing unit 2 can receive data from the device 1 and transmit data to it, it is no relevant the placement of said processing unit 2.

The device 1 can slide along the bar of the support 110 in order to reach a position substantially coincident with the one of the container precursor (not shown) so that it can perform the tests to characterise said container precursor. Once the tests have been performed, the device 1 can slide up or down along the support 110 in order to reach a position where it does not interfere with the container precursor. Although such configuration is preferred, in other embodiments the device 1 can have a fixed position.

FIG. 8 shows a flow diagram of first exemplary embodiment of a method for calibrating an automatic pouch forming machine according to the present invention. This method is specially envisaged or configured for calibrating an automatic pouch forming machine comprising an unwinding unit for unwinding a pouch precursor made of a band of a flexible heat-sealable film in a forward movement direction; a folding unit of the band configured for folding said band in half on itself along at least one folding line parallel to the forward movement direction, a welding unit 3 of the folded band configured for making welding lines at least in a direction transverse to the forward movement direction of the folded band; and a drive unit for moving the band in the forward movement direction.

The first exemplary embodiment of a method for calibrating an automatic pouch forming machine comprises the steps of: performing a test operation 1000 on the material of the pouch precursor; performing a characterisation 2000 of the material of the pouch precursor based on the results of the testing of the material performed; conducting a comparison 3000 of the characterised material of the pouch precursor with other known materials on which the steps of the test operation 1000 and the characterisation 2000 have already been performed, said known materials being further related to known operation parameters of a pouch forming machine including welding pressure, welding temperature and welding time; and automatically adjusting the automatic pouch forming machine 4000 with operating parameters, including welding pressure, welding temperature and welding time for the tested material of the pouch precursor, obtained from the result of conducting the comparison 3000 and an algorithm treating said results.

In this first exemplary embodiment, the step of performing a test operation 1000 further comprises the steps of: pressing the band 1100 folded on itself of the pouch precursor with a punch 10, said punch 10 being heatable at least at one tip by a heat source at a given temperature; and measuring the penetration 1200 of the punch 10 in the band folded on itself with a measurement device. However, as stated hereinabove, in other embodiments of the method for calibrating an automatic pouch forming machine object of the present invention, the container precursor made of a band of flexible heat-sealable film can also be characterised or tested in an unfolded configuration or being folded two or more times.

In this first exemplary embodiment, the step of performing a test operation 1000 is performed on the automatic pouch forming machine (see FIGS. 6 and 7) while the pouch precursor moves in its forward movement direction. However, in other embodiments, the step of performing a test operation 1000 can be performed with the pouch precursor stopped with respect to its forward movement direction. In other embodiments, the step of performing a test operation 1000 can also be performed outside the automatic pouch forming machine to be calibrated, for example, in a material testing lab or any other suitable place to perform such kind of testing.

In the first exemplary embodiment of a method according to the present invention, the penetration of the punch 10 in the pouch precursor is measured with respect to one or more values of at least two of the following variables:
   i. pressure applied by the punch 10 to the pouch precursor;
   ii. temperature of the tip of the punch 10;
   iii. duration of the pressure applied to the pouch precursor by the punch 10.

In this first exemplary embodiment, the step of performing a characterisation 2000 comprises the step of obtaining a characteristic curve of the tested material based on the measurements of the penetration of the punch 10 under given conditions of pressure, temperature and duration. However, in other embodiments this step may not be performed.

In a second exemplary embodiment of a method for calibrating an automatic pouch forming machine, the method further comprises the step of generating a database with the operating parameters of an automatic pouch forming machine for a plurality of known materials, that is to say, known operating parameters for known pouch precursor materials are entered in a database, so that in the steps of conducting a comparison 3000 and automatically adjusting the automatic pouch forming machine 4000, an algorithm can determine the operating parameters corresponding to the tested material in particular. In said second exemplary embodiment, the operating parameters corresponding to a tested material obtained in step 4000 are entered in said database, so that said database is increased and improved over time.

In the first and second exemplary embodiments of a method for calibrating an automatic pouch forming machine according to the present invention, the steps of conducting a comparison 3000 and automatically adjusting the automatic pouch forming machine 4000, are implemented by a processing unit 2 which executes a machine learning algorithm to determine the operating parameters corresponding to the tested material, and in particular, corresponding to the properties of the tested material.

It will be understood that various parts of one embodiment of the invention can be freely combined with parts described in other embodiments, even being said combination not explicitly described, provided that such combination is within the scope of the claims and that there is no harm in such combination.

What is claimed is:

1. Method for calibrating an automatic pouch forming machine comprising an unwinding unit for unwinding a pouch precursor made of a band of a flexible heat-sealable film in a forward movement direction; a folding unit of the band configured for folding said band in half on itself along at least one folding line parallel to the forward movement direction, a welding unit of the folded band configured for making welding lines at least in a direction transverse to the forward movement direction of the folded band; and a drive unit for moving the band in the forward movement direction; the method comprising the steps of:
    performing a test operation on the material of the pouch precursor;
    performing a characterisation of the material of the pouch precursor based on results of the test operation on the material of the pouch precursor, thereby obtaining a characterised material of the pouch precursor;
    conducting a comparison of the characterised material of the pouch precursor with other materials on which the steps of the test operation and the characterisation have already been performed, said other materials being further related to operating parameters of the pouch forming machine; and
    automatically adjusting the automatic pouch forming machine with operating parameters for the material of the pouch precursor, obtained from conducting the comparison and an algorithm treating results of said comparison;

wherein the step of performing a test operation is performed by:
    pressing the band folded on itself of the pouch precursor with a punch, thereby producing a penetration of the punch in the band folded on itself, said punch being heatable at least at one tip by a heat source at a given temperature; and
    measuring the penetration of the punch in the band folded on itself with a measurement device;
and wherein the steps of conducting a comparison and automatically adjusting the automatic pouch forming machine, are implemented by a processing unit.

2. Method, according to claim 1, wherein the step of performing a test operation on the material of the pouch precursor is performed on the automatic pouch forming machine.

3. Method, according to claim 2, wherein the step of performing a characterisation of the material of the pouch precursor is performed while the pouch precursor moves in the forward movement direction.

4. Method, according to claim 2, wherein the step of performing a test operation on the material of the pouch precursor is performed with the pouch precursor stopped with respect to the forward movement direction of the pouch precursor.

5. Method, according to claim 1, wherein the step of performing a test operation on the material of the pouch precursor is performed outside the automatic pouch forming machine.

6. Method, according to claim 1, wherein the penetration of the punch in the pouch precursor is measured with respect to one or more values of at least two of the following variables:
    i. pressure applied by the punch to the pouch precursor;
    ii. temperature of the tip of the punch;
    iii. duration of the pressure applied to the pouch precursor by the punch.

7. Method, according to claim 6, wherein the step of performing a characterisation of the material of the pouch precursor comprises the step of obtaining a characteristic curve of the tested material based on the measurements of the penetration of the punch under given conditions of pressure, temperature and duration.

8. Device for characterising a pouch precursor made of flexible heat-sealable film, said device comprising:
    a punch;
    a heat source for heating at least a tip of the punch to a given temperature;
    an actuator for pressing the punch against the pouch precursor made of heat-sealable film, with a given pressure; and
    a measurement device for measuring the penetration of the punch in the pouch precursor, under the given conditions of temperature and pressure.

9. Device, according to claim 8, wherein the punch comprises a ceramic resistor, acting as a heat source, arranged at a tip of the punch.

10. Device, according to claim 8, wherein it further comprises a processing unit configured to execute the steps of conducting a comparison and automatically adjusting an automatic pouch forming machine of with a method according to claim 1.

11. Device, according to claim 8, wherein the actuator comprises a pneumatic or a hydraulic cylinder operatively connected to the punch via at least a connecting rod.

12. System for calibrating an automatic pouch forming machine, the system comprising:
- an automatic pouch forming machine comprising:
  - an unwinding unit for unwinding a pouch precursor made of a band of a flexible heat-sealable film in a forward movement direction;
  - a folding unit of the band configured for folding said band in half on itself along at least one folding line parallel to the forward movement direction, a welding unit of the folded band configured for making welding lines at least in a direction transverse to the forward movement direction of the folded band; and
  - a drive unit for moving the band in the forward movement direction,
- a device for characterising a pouch precursor made of flexible heat-sealable film according to claim 8; and
- a processing unit configured to execute steps of conducting a comparison of the characterised material of the pouch precursor with other materials and automatically adjusting the automatic pouch forming machine of a method according to claim 1.

13. System, according to claim 12, wherein the measurement device is configured to measure the penetration of the punch in the band folded on itself of the pouch precursor by measuring the travel of the punch.

* * * * *